(12) United States Patent
Overson (10) Patent No.: US 11,736,512 B1
(45) Date of Patent: Aug. 22, 2023

(54) METHODS FOR AUTOMATICALLY PREVENTING DATA EXFILTRATION AND DEVICES THEREOF

(71) Applicant: Shape Security, Inc., Palo Alto, CA (US)

(72) Inventor: Jarrod S. Overson, Cary, NC (US)

(73) Assignee: SHAPE SECURITY, INC., Santa Clara, CA (US)

( * ) Notice: Subject to any disclaimer, the term of this patent is extended or adjusted under 35 U.S.C. 154(b) by 193 days.

(21) Appl. No.: 17/069,180

(22) Filed: Oct. 13, 2020

Related U.S. Application Data (60) Provisional application No. 62/915,485, filed on Oct. 15, 2019.

(51) Int. Cl.
*H04L 9/40* (2022.01)

(52) U.S. Cl.
CPC ...... *H04L 63/1441* (2013.01); *H04L 63/1416* (2013.01); *H04L 63/20* (2013.01)

(58) Field of Classification Search
CPC .. H04L 63/1441; H04L 63/1416; H04L 63/20
USPC .......................................................... 726/23
See application file for complete search history.

(56) References Cited

U.S. PATENT DOCUMENTS

| | | | | |
|---|---|---|---|---|
| 7,958,232 B1 * | 6/2011 | Colton | ................. | H04L 67/565 709/224 |
| 8,893,294 B1 * | 11/2014 | Steele, III | ........... | G06F 16/9574 726/22 |
| 9,027,142 B1 * | 5/2015 | Call | ....................... | G06F 21/54 726/25 |
| 9,075,990 B1 * | 7/2015 | Yang | ....................... | G06F 21/55 |
| 9,516,055 B1 * | 12/2016 | Liu | ..................... | H04L 63/1416 |
| 2010/0017880 A1 * | 1/2010 | Masood | ................. | G06F 21/56 709/224 |
| 2014/0283069 A1 * | 9/2014 | Call | .................... | H04L 63/1483 726/23 |
| 2014/0310811 A1 * | 10/2014 | Hentunen | ........... | H04L 63/1441 726/23 |
| 2014/0331318 A1 * | 11/2014 | Windsor | ............... | H04L 67/564 726/22 |
| 2017/0237766 A1 * | 8/2017 | Mattson | ................ | G06F 21/554 726/23 |

(Continued)

*Primary Examiner* — Teshome Hailu
(74) *Attorney, Agent, or Firm* — Troutman Pepper Hamilton Sanders LLP (F5 Patents)

(57) ABSTRACT

Methods, non-transitory computer readable media, protection server apparatuses, and network security systems that improve network security for web applications by mitigating cyberattacks that cause the exfiltration of data are illustrated. With this technology, network request(s) are received from a client that specify domain(s) to which the client has sent data during rendering of a webpage. The webpage includes instrumentation code configured to intercept and post the network requests. A determination is then mage when one of the domain(s) is a malicious domain. Interceptor code is generated based on a type of attack that is associated with the one of the domains, when the determination indicates the one of the domains is a malicious domain. The instrumentation code is then updated to include the interceptor code. The interceptor code is configured to mitigate the attack when the webpage is subsequently rendered by another client.

16 Claims, 4 Drawing Sheets

(56) References Cited

U.S. PATENT DOCUMENTS

| | | | | |
|---|---|---|---|---|
| 2018/0139180 A1* | 5/2018 | Napchi | ................... | H04L 43/08 |
| 2019/0190931 A1* | 6/2019 | Levin | ...................... | H04L 63/20 |
| 2019/0327265 A1* | 10/2019 | Zhao | ................... | H04L 63/1466 |
| 2020/0351275 A1* | 11/2020 | Pearce | ................ | H04L 63/1416 |

* cited by examiner

METHODS FOR AUTOMATICALLY PREVENTING DATA EXFILTRATION AND DEVICES THEREOF

This application claims the benefit of U.S. Provisional Patent Application No. 62/915,485, filed Oct. 15, 2019, the entirety of which is incorporated herein by reference.

FIELD

This technology generally relates to computer network security and, more particularly, to methods and devices for automatically preventing data exfiltration from webpages.

BACKGROUND

"Magecart" refers to a type of network or web cyberattack in which hackers inject malicious skimmer computer code into e-commerce websites to steal customer payment card information as users enter it at a checkout page, for example, although other types of websites can be targeted and other types of information surreptitiously obtained in this type of cyberattack. A browser rendering a website served from an application server may load one hypertext markup language (HTML) file representing the foundation of the website, and then other web resources by making requests to a number of different domains on a single page load. Any web resource loaded in this manner has access to all browser APIs of the browser running on the end user computer.

Therefore, a web resource that has been loaded can read almost all in-page data, including payment information on a credit card form, information entered even before it is submitted, personal information present on an account page, passwords even though they are masked, addresses, shipping details, and other sensitive or personal data that is present on a webpage. Based on this foundation, magecart-style cyberattacks hook into a webpage, read sensitive or personal data, and then, at any time, post that data to a third party domain.

Accordingly, the skimmer computer code effectively diverts traffic to fake third-party domains, which may be unnoticed since it happens in a background request. Even though a submission may appear normal to a user, the data has been stolen and posted to the third-party domain. Magecart attacks haves been active for several years, with many relatively high-profile breaches, and is a continuing concern in the cybersecurity community.

A common way to detect whether an e-commerce website has been compromised is to manually compare the entire e-commerce code stack on the server side, line by line, to determine what, if anything, has changed since a prior scan or as compared to another baseline version. However, this approach is time and labor intensive. Furthermore, malicious script modifications may be obscured, so that they may be found too late, if at all. Even when corrective measures are finally taken, hackers may have changed the form of attack. Accordingly, current detection techniques to facilitate identification and mitigation of web skimming attacks are inefficient and ineffective to protect servers hosting websites that may be susceptible to such attacks.

SUMMARY

A network security method is disclosed that is implemented by a network security system, including one or more protection server apparatuses, server devices, and end station devices, and includes receiving from a client network request(s) that specify domain(s) to which the client has sent data during rendering of a webpage. The webpage includes instrumentation code configured to intercept and post the network requests. A determination is then mage when one of the domain(s) is a malicious domain. Interceptor code is generated based on a type of attack that is associated with the one of the domains, when the determination indicates the one of the domains is a malicious domain. The instrumentation code is then updated to include the interceptor code. The interceptor code is configured to mitigate the attack when the webpage is subsequently rendered by another client.

A protection server apparatus is disclosed that includes memory including programmed instructions stored thereon and one or more processors configured to be capable of executing the stored programmed instructions to receive from a client network request(s) that specify domain(s) to which the client has sent data during rendering of a webpage. The webpage includes instrumentation code configured to intercept and post the network requests. A determination is then mage when one of the domain(s) is a malicious domain. Interceptor code is generated based on a type of attack that is associated with the one of the domains, when the determination indicates the one of the domains is a malicious domain. The instrumentation code is then updated to include the interceptor code. The interceptor code is configured to mitigate the attack when the webpage is subsequently rendered by another client.

A non-transitory computer readable medium is disclosed that has stored thereon instructions for network security and includes executable code that, when executed by one or more processors, causes the processors to receive from a client network request(s) that specify domain(s) to which the client has sent data during rendering of a webpage. The webpage includes instrumentation code configured to intercept and post the network requests. A determination is then mage when one of the domain(s) is a malicious domain. Interceptor code is generated based on a type of attack that is associated with the one of the domains, when the determination indicates the one of the domains is a malicious domain. The instrumentation code is then updated to include the interceptor code. The interceptor code is configured to mitigate the attack when the webpage is subsequently rendered by another client.

A network security system also is disclosed that includes one or more protection server apparatuses, server devices, and end station devices with memory including programmed instructions stored thereon and one or more processors configured to be capable of executing the stored programmed instructions to receive from a client network request(s) that specify domain(s) to which the client has sent data during rendering of a webpage. The webpage includes instrumentation code configured to intercept and post the network requests. A determination is then mage when one of the domain(s) is a malicious domain. Interceptor code is generated based on a type of attack that is associated with the one of the domains, when the determination indicates the one of the domains is a malicious domain. The instrumentation code is then updated to include the interceptor code. The interceptor code is configured to mitigate the attack when the webpage is subsequently rendered by another client.

This technology has a number of associated advantages including methods, non-transitory computer readable media, protection server apparatuses, and network security systems that more effectively identify and manage cyberattacks that exfiltrate data to malicious third parties. This technology advantageously instruments and intercepts points of exfiltration that can exist inside a webpage, and record each domain to which outbound data is being sent. The domains are then analyzed to determine whether any are malicious. If a malicious domain is identified, the technology described and illustrated herein mitigate the attack by logging requests, transmitting notifications, disabling request(s) or modifying outbound data so that the outbound data is no longer effective, for example. Accordingly, webpages and users are better protected from exfiltration by browsers at client devices with this this technology.

DETAILED DESCRIPTION

Figure 1:
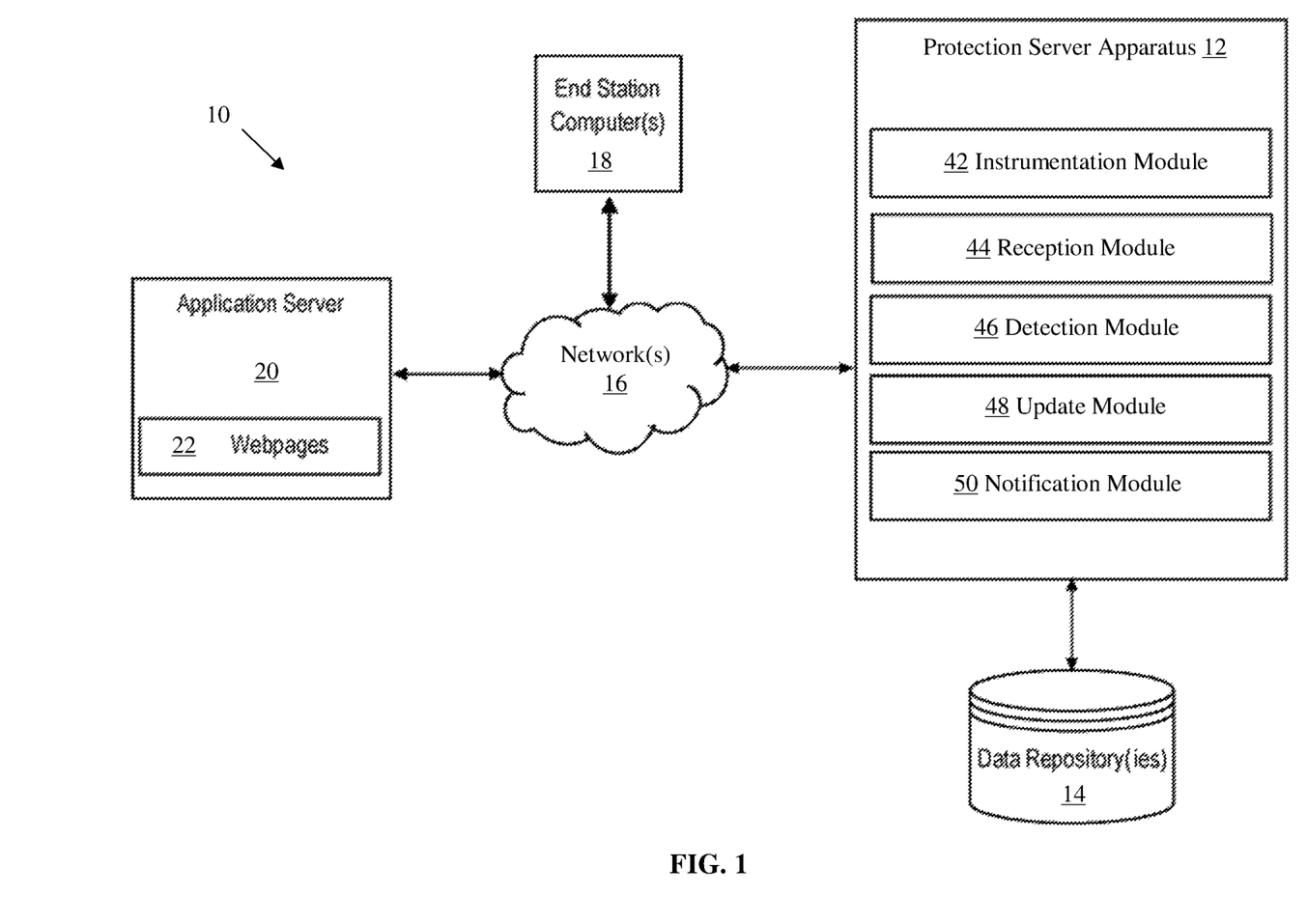
FIG. 1 is a block diagram of an exemplary network security system with a protection server apparatus.

Referring to FIG. 1, an exemplary network environment that incorporates an exemplary network security system 10 is illustrated. The network security system 10 in this example includes a protection server apparatus 12 that is coupled to data repository 14 and, via network(s) 16, end station computer(s) 18 and an application server 20 hosting webpages 22, although the protection server apparatus 12, data repository 14, end station computer(s) 18, and application server 20 may be coupled together via other topologies. The network security system 10 also may include other network devices such as routers or switches, for example, which are known in the art and thus will not be described herein. This technology provides a number of advantages including methods, non-transitory computer readable media, network security systems, and protection server apparatuses that more effectively identify and mitigate network attacks that exfiltrate sensitive data.

In this particular example, the protection server apparatus 12, end station computer(s) 18, and application server 20 are disclosed in FIG. 1 as dedicated hardware devices, but one or more of the protection server apparatus 12, end station computer(s) 18, and application server 20 can also be implemented in software within one or more other devices in the network security system 10 in other examples. For example, the application server 20 can host the protection server apparatus 12.

Figure 2:
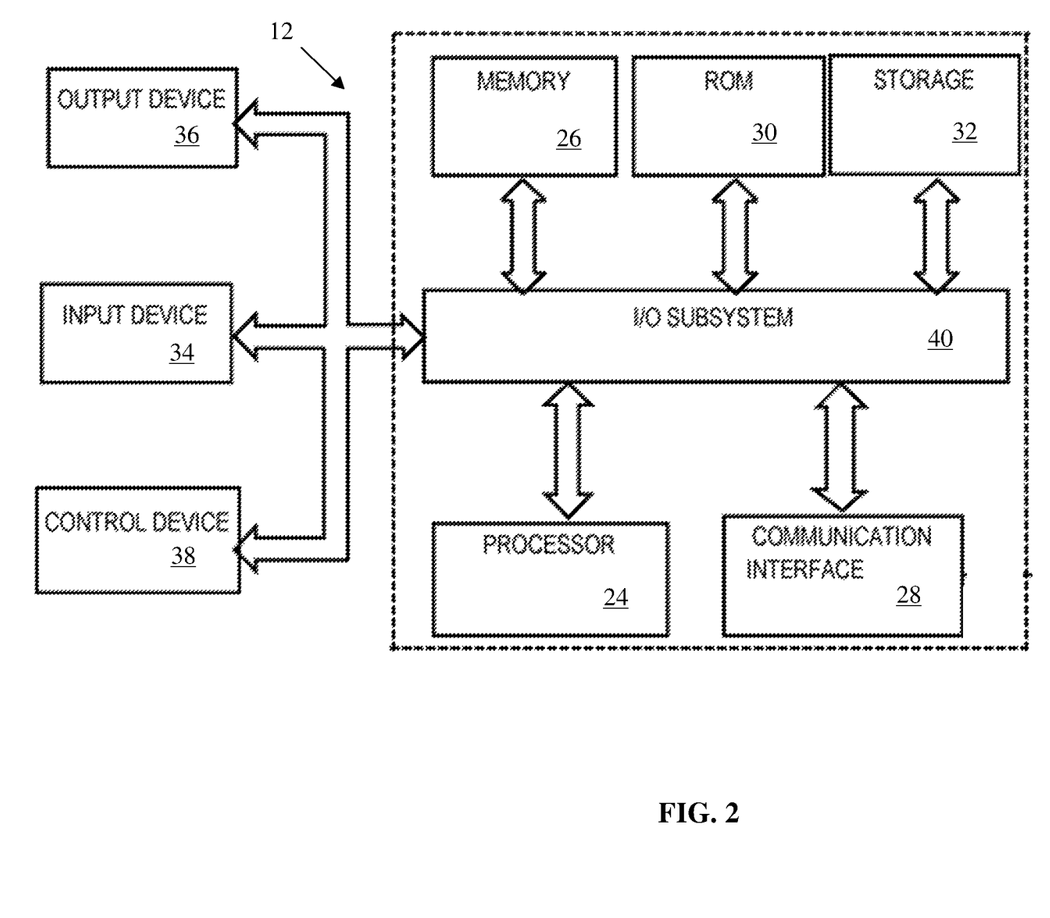
FIG. 2 is a block diagram of an exemplary protection server apparatus.

Referring to FIGS. 1-2, the protection server apparatus 12 of the network security system 10 may perform any number of functions in addition to detecting and mitigating network attacks, including managing network traffic, load balancing network traffic, or accelerating network traffic for web applications hosted by the application server 20, for example. The protection server apparatus 12 in this example includes a processor 24, memory 26, a communication interface 28, random access memory (ROM) 30, storage 32, an input device 34, an output device 36, and a control device 38, which are coupled together by an I/O subsystem 40 or other type of bus or communication link, although the protection server apparatus 12 can include other types or numbers of elements in other configurations.

The processor 24 of the protection server apparatus 12 may execute programmed instructions stored in the memory 28 or ROM 30 of the protection server apparatus 12 for any number of the functions identified above. The processor 24 may include central processing unit(s) (CPU(s)) or general purpose processor(s) with processing core(s), for example, although other types of processor(s) can also be used.

The memory 26 of the protection server apparatus 12 stores these programmed instructions for aspects of the present technology as described and illustrated herein, although some or all of the programmed instructions also could be stored elsewhere. A variety of different types of memory storage devices, such as random access memory (RAM), hard disk, solid state drives, flash memory, or other computer readable medium which is read from and written to by a magnetic, optical, or other reading and writing system that is coupled to the processor 24, can be used for the memory 26.

The memory 26 can store application(s) that can include computer executable or programmed instructions that, when executed by the protection server apparatus 12, cause the protection server apparatus 12 to perform actions, such as to transmit, receive, or otherwise process messages, for example, and to perform other actions described and illustrated below with reference to FIGS. 3-4. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the protection server apparatus 12 itself, may be located in virtual server(s) running in a cloud-based computing environment rather than being tied to one or more specific physical network computing devices. Also, the application(s) may be running in virtual machine(s) (VM(s)) executing on the protection server apparatus 12. Additionally, in example(s) of this technology, virtual machine(s) running on the protection server apparatus 12 may be managed or supervised by a hypervisor.

The ROM 30 may include various forms of programmable ROM (PROM) such as erasable PROM (EPROM) or electrically erasable PROM (EEPROM). A unit of storage 32 may include various forms of non-volatile RAM (NVRAM), such as FLASH memory, or solid-state storage, magnetic disk or optical disk such as CD-ROM or DVD-ROM, and may be coupled to I/O subsystem 40 for storing information and instructions. Storage 32 is an example of a non-transitory computer-readable medium that may be used to store instructions and data which when executed by the processor 24 cause performing computer-implemented methods to execute the techniques described and illustrated herein.

In this particular example, the memory 26 includes an instrumentation module 42, a reception module 44, a detection module 46, an update module 48, and a notification module 50. Other modules, application, or sets of instructions may be included to form a complete system such as an operating system, utility libraries, a presentation layer, database interface layer and so forth.

The instrumentation module 53 may cause the protection server apparatus 12 to access and modify hypertext markup language (HTML) or other source codes of webpages 22 hosted by application server 20 to include instrumentation code. The instrumentation code may be delivered as a JavaScript resource that is referenced by a script tag in HTML source code of the webpages 22, or the instrumentation code may be included directly within the HTML source code, and other methods for incorporating the instrumentation code in one or more of the web pages 22 can also be used.

In another example, the application server 20 may instead modify the webpages 22 to include the instrumentation code by accessing the instrumentation code from the protection server apparatus 12. The HTML source code of the webpages 22, which includes the instrumentation code, is executed on end station computer(s) 18, as described and illustrated in more detail below.

The instrumentation code is located above other scripts that are associated with compromisable web resources such that these other scripts that exist in the HTML source code would get wrapped by the instrumentation code. In one example, the instrumentation code may be located above at least third-party web resources in the HTML source code for the web pages 22. Optionally, the instrumentation code may be located above first-party web resources in the HTML source code in other examples.

The instrumentation code includes custom request method(s) that are configured to override a native request application programming interface (API) method(s) in the HTML source code of the webpages 22 and include logic to examine one or more parameters. Depending on particular requirements, the custom request method(s) may retain a reference to the native API method(s) and deliver the parameters to the native API method(s) or, alternatively, the custom request method(s) may disable a browser API that leads to an outbound request by not calling the native API method(s).

In one particular example, in a HTML source code of one of the webpages 22, the native XMLHttpRequest method is included to initiate a request for a web resource. The instrumentation code in the HTML source code would replace the native XMLHttpRequest method with a custom XMLHttpRequest method such that the native method is no longer referenceable by other scripts in the HTML source code. The custom XMLHttpRequest method includes logic to record and transmit to protection server apparatus 12 requested domains to which data is being sent to from the one of the webpages 22. The custom XMLHttpRequest method may or may not call the native XMLHttpRequest method.

The reception module 44 may cause the protection server apparatus 12 to receive network requests from end station computer(s) 18. A network request may include a list of requested domains to which data is being sent to from one of the webpages 22 and may be posted by the instrumentation code executing on the end station computer(s) 18. A network request may be posted by an asynchronous request, which may be performed at the latest possible point of a webpage lifecycle, just before a submission event, or in line with a submission event, for example, although network request(s) can be posted at other times in other examples.

The detection module 46 may cause the protection server apparatus 12 to analyze the information received from end station computer(s) 18. For example, the protection server apparatus 12 may receive, from one of the end station computer(s) 18, a network request including a list of requested domains to which data is being sent to from one of the webpages 22. The protection server apparatus 12 may review the list for new domains by comparing to a list of known domains called from within the one of the webpages 22. The list may be a whitelist of legitimate domains, a blacklist of malicious domains, or a combination thereof. Alternatively, the list may be an implied list of legitimate domains (e.g., entering and exiting from the same domain).

Upon detection of a new domain, the protection server apparatus 12 may analyze the new domain to determine whether it is a legitimate or malicious domain and is not just a new API or new feature that had been added to the one of the webpages 22. For example, the protection server apparatus 12 may compare certificate issuers, domain registers, or domain name system (DNS) records or settings to see determine whether or not the new domain is likely, or can be classified as, legitimate or malicious. The protection server apparatus 12 may also analyze all or at least the previously known domains, to determine whether they are still legitimate. The protection server apparatus 12 may also update a whitelist of known domains with newly detected legitimate domains or update a blacklist of known domains with newly detected malicious domains.

The update module 48 may cause the protection server apparatus 12 to automatically and dynamically generate interceptor code based on the type of attack, upon detection of a malicious domain. The protection server apparatus 12 may automatically update the instrumentation code to include the interceptor code, either directly or by reference.

The interceptor code includes logic to reduce continued damage from, or otherwise mitigate or prevent, the attack. For example, the interceptor code may cancel request(s) made from one of the webpages 22. In another example, the interceptor code may set a flag or an indicator in request(s) made from one of the webpages 22 such that the intended recipient of the request is made aware of the attack. In yet another example, the interceptor code may poison data that is going out from one of the webpages 22. In particular, the interceptor code may modify the data that is going out so that it is no longer effective but is not immediately visible to the attacker that anything has been detected with respect to the exploit Any data may be modified in arbitrary ways, such as by randomizing or generating non-usable information. As examples, usernames may be shifted or randomized in a way that it is still believable as a name, and credit card numbers, expiration dates, and/or card verification values (CVVs) associated with a credit card may be transposed or randomized. In one example, the interceptor code does not mitigate an active exploit on one of the webpages 22 but rather is applied to all future loads or renderings of the one of the webpages 22.

In some examples, it may be important to minimize the amount of damage that can possibly occur, not to eliminate it, because anything that completely eliminates it would be observable by the attacker. In these examples, the instrumentation or interceptor code can allow for invisibility for as long as possible, while reducing damage to protect users for long enough to allow the users or administrator to initiate a mitigation action without alerting the attacker.

In another example, rather than blocking a request or changing outgoing data, transactions are allowed to proceed. The notification module 50 in this example may cause the protection server apparatus 12 to automatically generate a notification message to send to the application server 20, or an associated administrator device (not shown), regarding the detected malicious domain. Notification messages alert users of possible attacks and allow them to determine how to proceed forward and mitigate the attacks.

The protection server apparatus may be coupled to data repository(ies) 14 that are configured for storing instrumentation codes, interceptor codes, notification messages, lists of known domains, and other data pertinent to the detection of data exfiltration and the mitigation of damages. The data repository(ies) 14 may also store digital data for accounts associated with the application server 20; such as an account is a discrete set of stored digital data that identifies a unique identity, which may be a computer or other entity. Accounts are normally associated with access credentials such as username, password, or two-factor authentication data, so that receiving correct access credentials is required for access to an account or to use an account to interact with other elements illustrated in FIG. 1.

Referring back to FIG. 2, the communication interface 28 of the protection server apparatus 12 operatively couples and communicates between the protection server apparatus 12, application server, and end station computer(s) 18, which are coupled together at least in part by the network(s) 16, although other types or numbers of communication networks or systems with other types or numbers of connections or configurations to other devices or elements can also be used.

By way of example only, the network(s) 16 can include local area network(s) (LAN(s)) or wide area network(s) (WAN(s)), and can use TCP/IP over Ethernet and industry-standard protocols, although other types or numbers of protocols or communication networks can be used. The network(s) 16 in this example can employ any suitable interface mechanisms and network communication technologies including, for example, Ethernet-based Packet Data Networks (PDNs) hosting HyperText Transfer Protocol (HTTP), for example.

The protection server apparatus 12 is illustrated in this example as including a single device, but can include multiple devices in other examples, each of which has processor(s) (each processor with processing core(s)) that implement step(s) of this technology. In these examples, one or more of the devices can have a dedicated communication interface or memory. Alternatively, one or more of the devices can utilize the memory 26, communication interface 28, or other hardware or software components of one or more other of the devices included in the protection server apparatus 12.

Accordingly, one or more of the devices that together comprise the protection server apparatus 12 can be stand-alone devices or integrated with one or more other devices or apparatuses, such as the application server 20, for example. Moreover, one or more of the devices of the protection server apparatus 12 can be in a same or a different communication network including one or more public, private, or cloud networks, for example. In yet other examples, a plurality of protection server apparatus are deployed, within and/or outside of a local area network associated with the application server 20, which communicates with any number of application servers or end station computers, and other network topologies can also be used.

The protection server apparatus 12 also is coupled via I/O subsystem 40 to at least one output device 36 in some examples. The output device 36 can be a digital computer display. Examples of a display that may be used in various embodiments include a touch screen display or a light-emitting diode (LED) display or a liquid crystal display (LCD) or an e-paper display. The protection server apparatus 12 may include other type(s) of output devices, alternatively or in addition to a display device. Examples of other output devices include printers, ticket printers, plotters, projectors, sound cards or video cards, speakers, buzzers or piezoelectric devices or other audible devices, lamps or LED or LCD indicators, haptic devices, actuators or servos.

At least one input device 34 is coupled to I/O subsystem 40 in some examples for communicating signals, data, command selections or gestures to processor 304. Examples of input devices 34 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 38, which may perform cursor control or other automated control functions such as navigation in a graphical interface on a display screen, alternatively or in addition to input functions. Control device 38 may be a touchpad, a mouse, a trackball, or cursor direction keys for communicating direction information and command selections to processor 24 and for controlling cursor movement on display 36. The input device 34 may have at least two degrees of freedom in two axes, a first axis (e.g., x) and a second axis (e.g., y), that allows the device to specify positions in a plane. Another type of input device 34 is a wired, wireless, or optical control device such as a joystick, wand, console, steering wheel, pedal, gearshift mechanism or other type of control device. An input device 34 may include a combination of multiple different input devices, such as a video camera and a depth sensor.

In another example, the protection server apparatus 12 may be an internet of things (IoT) device or other type of network device in which one or more of the output device 36, input device 34, and control device 38 are omitted. Or, in such an embodiment, the input device 34 may be one or more cameras, motion detectors, thermometers, microphones, seismic detectors, other sensors or detectors, measurement devices or encoders and the output device 36 may be a special-purpose display such as a single-line LED or LCD display, one or more indicators, a display panel, a meter, a valve, a solenoid, an actuator or a servo.

Referring back to FIG. 1, the application server 20 of the network security system 10 in this example may be a commercial web server hosting the webpages 22 that is accessible by end station computer(s) 18. The webpages 22 may request web resources from any number of other domains. Example types of requests include XMLHttpRequests, Fetch API requests, WebSockets, WebRTCs, Beacons, form submissions, resource fetching (such as links, scripts, images, videos, etc.), and others.

The application server 20 includes processor(s), memory, and a communication interface, which are coupled together by a bus or other communication link (not illustrated), although other numbers or types of components could be used. The application server 20 in this example can exchange communications to facilitate interactions with hosted web applications, which are optionally protected by the protection server apparatus, 12 as described and illustrated herein, by users of the end station computer(s) 18.

Accordingly, in some examples, the application server 20 processes login and other requests received from the end station computer(s) 18 via the network(s) 16 according to the HTTP-based application RFC protocol, for example. A protected web application may be operating on the application server 20 and transmitting data (e.g., files or web pages) to the end station computer(s) 18 in response to requests from the end station computer(s) 18. The application server 20 may be hardware or software or may represent a system with multiple servers in a pool, which may include internal or external networks.

Although the application server 20 is illustrated as a single device, one the application server 20 in other examples may include multiple servers distributed across one or more distinct network computing devices that together comprise the application server 20. Moreover, the application server 20 is not limited to a particular configuration. Thus, the application server 20 may contain network computing devices that operate using a master/slave approach, whereby one of the network computing devices of the application server 20 operate to manage or otherwise coordinate operations of the other network computing devices. application server 20 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, the application server 20 can operate within the protection server apparatus 12 itself rather than as a standalone server communicating with the protection server apparatus 12 via the network(s) 16. In this example, the application server 20 operates within the memory 26 of the protection server apparatus 12. Accordingly, any number of end station computer(s) and application servers may be used. One end station computer 18 and one application server 20 are shown in FIG. 1 merely for purposes of providing an illustrative example.

Each of the end station computer(s) 18 of the network security system 10 in this example includes any type of computing device that can exchange network data and interface with the webpages 22, such as mobile, desktop, laptop, or tablet computing devices, virtual machines (including cloud-based computers), or the like. Each of the end station computer(s) 18 in this example includes a processor, memory, and a communication interface, which are coupled together by a bus or other communication link (not illustrated), although other numbers or types of components could also be used.

The end station computer(s) 18 may run interface applications, such as standard web browsers or native client applications, which may provide an interface to make requests for, and receive content stored on, the application server 20 via the network(s) 16. The end station computer(s) 18 may further include a display device, such as a display screen or touchscreen, or an input device, such as a keyboard, for example (not illustrated).

Although the exemplary network security system 10 with the protection server apparatus 12, application server 20, end station computer(s) 18, and network(s) 16 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the protection server apparatus 12, application server 20, or end station computer(s) 18, for example, may be configured to operate as virtual instances on the same physical machine. In other words, one or more of the protection server apparatus 12, application server 20, or end station computer(s) 18 may operate on the same physical device rather than as separate devices communicating through communication network(s). Additionally, there may be more or fewer protection server apparatuses, application servers, or end station computers than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having executable or programmed instructions stored thereon, such as in the memory 26, ROM 30, or storage 32 of the protection server apparatus 12, for one or more aspects of the present technology, as described and illustrated by way of the examples herein. The instructions in some examples include executable code that, when executed by one or more processors, such as the processor 24 of the protection server apparatus 12, cause the processors to carry out steps necessary to implement the methods of the examples of this technology that are described and illustrated herein.

Figure 3:
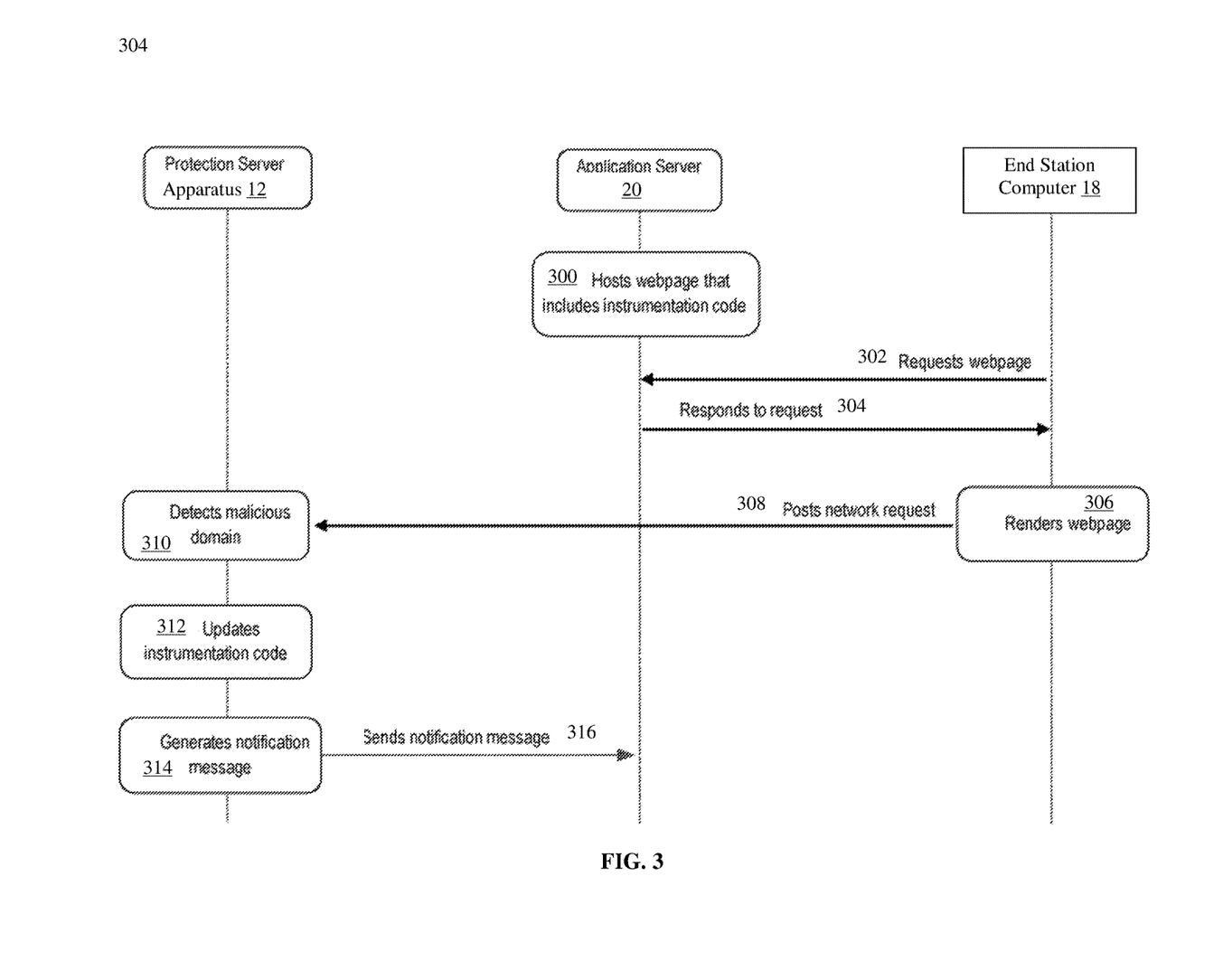
FIG. 3 is a timing diagram of an exemplary method for detecting and mitigating network attacks that exfiltrate sensitive data.

Referring to FIG. 3, a timing diagram of an exemplary method for detecting and mitigating network attacks that exfiltrate sensitive data is illustrated. In step 300 in this example, the application server 20 hosts one of the webpages 22 that has been modified to include instrumentation code. The protection server apparatus 12 may access and modify the one of the webpages 22 to include the instrumentation code. In another example, the application server 20 may access the instrumentation code from the protection server apparatus 12 and modify the one of the webpages 22 to include the instrumentation code. The instrumentation code includes logic to record and post or transmit requested domains to which data is being sent to from the one of the webpages 22.

In step 302, the end station computer 18 requests the one of the webpages 22 hosted by the application server 20. The end station computer 18 may execute a web browser application program that is capable of receiving, rendering, and causing display of the webpages 22 based upon structured markup language code or instructions in HTML, extensible markup language (XML), or similar languages.

In step 304, the application server 20 responds to the request with the one of the webpages 22 requested by the end station computer 18 in step 302. The one of the webpages 22 provided by the application server 20 in response to the request in step 304 includes the instrumentation code.

In step 306, the end station computer 18 loads or renders the one of the webpage 22. The one of the webpages 22 is rendered for the first time after modification to include the instrumentation code in this particular example. The instrumentation code intercepts one or more points of exfiltration in the one of the webpages 22 and generates a list of requested domains to which data is being sent to from the one of the webpages 22. In some examples, the instrumentation code is configured to intercept each point of exfiltration and, in other examples, only a subset of the points of exfiltration can be marked or otherwise identified for monitoring by the instrumentation code.

In step 308, the end station computer 104 posts a network request including the list of requested domains of data being sent out from the one of the webpages 22. In one example, the network request is posted by the instrumentation code via the network(s) 16.

In step 310, the protection server apparatus 12 receives the network request posted in step 308 and analyzes the list of requested domains included therein. The protection server apparatus 12 may review the list for new domains by comparing to at least one list of known domains associated with the one of the webpages 22 in some examples. Upon detection of a new domain, the protection server apparatus 12 may analyze the new domain to determine whether it is a malicious domain and is not a new API or new feature that had been added to the one of the webpages 22, for example, by comparing certificate issuers, domain registers, or DNS records or settings.

The protection server apparatus 12 may also analyze the previously known domains to determine whether they are still legitimate. The protection server apparatus 12 may also update a whitelist of known legitimate domains with any newly detected legitimate domains. The protection server apparatus 12 may also update a blacklist of known malicious domains with any newly detected malicious domains.

In step 310, the protection server apparatus 12 automatically and dynamically generates interceptor code based on the type of attack upon detection of a malicious domain in the list of domains received and analyzed in step 310. The protection server apparatus 12 may automatically update the instrumentation code to include the interceptor code or to reference the interceptor code such that interceptor code is enabled during subsequent loads or renderings of the one of the webpages 22.

During subsequent loads or renderings of the one of the webpages 22 by the same or different end station computer 18, the interceptor code may cancel a request(s) made from the one of the webpages 22, poison data that is going out from the one of the webpages 22, or otherwise initiates another action to mitigate, reduce, or eliminate damage resulting from the attack. The initiated action can depend on the type of attack associated with the malicious domain such that more or less aggressive actions can be taken, different types of actions can be taken, or the action can be concealed so as to be invisible to the attacker, for example, and other methods for determining the actions taken by, and defined within, the interceptor code can also be used in other examples.

Alternatively, or in addition to step updating the instrumentation code to include the interceptor code, in step 314, the protection server apparatus 12 generates a notification message regarding the malicious domain, which is sent to the application server 20 in step 316. The notification message alerts the application server 20 of the attack and allows the application server 20 to determine how to proceed. Alternatively, or in addition to step 316, the protection server apparatus 12 may send the notification message to an administrator computer, designated e-mail address, account, or other location.

Figure 4:
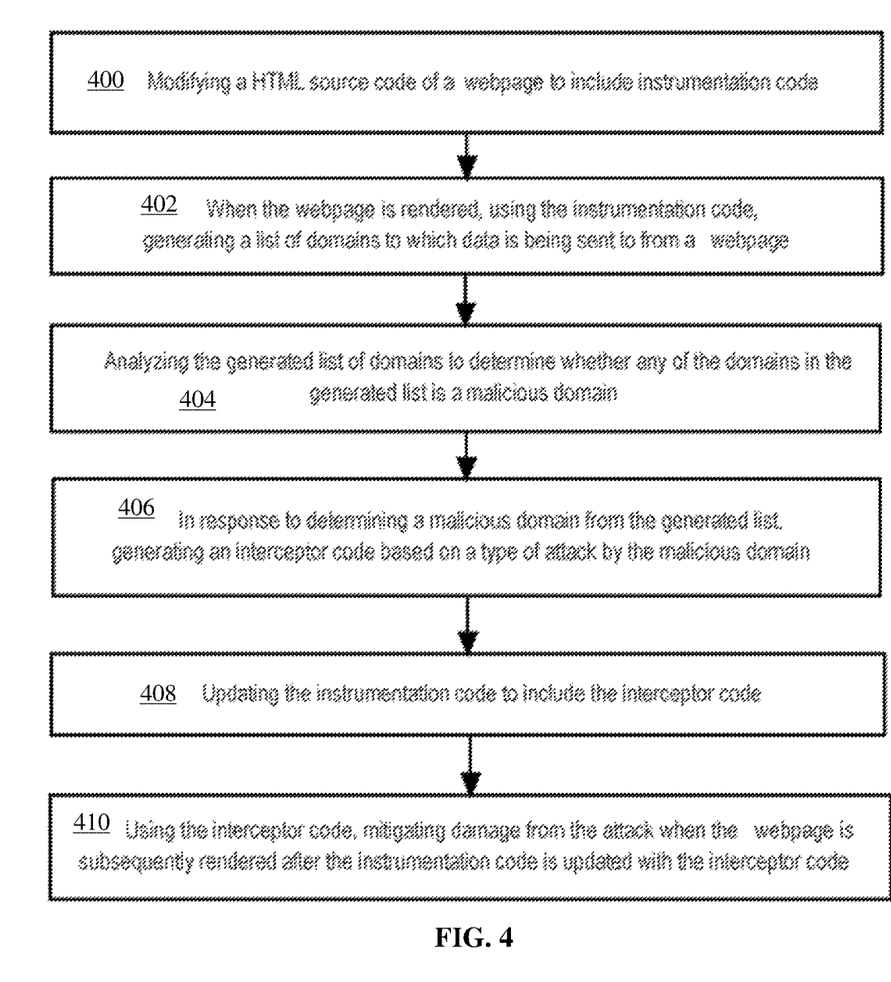
FIG. 4 is a flowchart of an exemplary method for detecting and mitigating network attacks that exfiltrate sensitive data.

Referring to FIG. 4, a flowchart of an exemplary method for detecting and mitigating network attacks that exfiltrate sensitive data is illustrated. For purposes of illustrating a clear example, the method of FIG. 4 is described herein with reference to execution using certain elements of FIGS. 1-2; however, FIG. 4 may be implemented in other embodiments using computing devices, programs or other computing elements different than those of FIGS. 1-2. Further, although the blocks 400-410 are illustrated in order, the blocks may also be performed in parallel, or in a different order than described herein. The method may also include additional or fewer blocks, as needed or desired. For example, one or more of the blocks 400-410 can be combined into fewer blocks, divided into additional blocks, or removed based upon a desired implementation.

FIG. 4 may be implemented using one or more computer programs or other software elements organized as sequences of instructions stored on computer-readable storage media, such as the memory 26 of the protection server apparatus 12, for example. FIG. 4, and each other flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 4. The development, deployment, testing, and debugging of functional programs is deemed to be within the level of skill in the art to which this disclosure pertains.

In step 400 in this particular example, HTML source code of one or more of the webpages 22 hosted by the application server 20 are modified to include instrumentation code. HTML source code of the webpages 22 may be modified by the protection server apparatus 12 or by the application server 20. The webpages 22 that are modified may be statically retrieved and delivered, or dynamically generated by the application server 20, for delivery to a browser of an end station computer 18 for rendering as part of providing an application service to the end station computer 18. The instrumentation code may be added, for example, to browser-executable script code such as JavaScript.

Instrumentation may be accomplished using a variety of techniques. In one example, the instrumentation code includes at least one custom request method configured to override a corresponding native request method such that other JavaScript that executes in the webpage context will only be able to access the instrumented method. The custom request method may retain a reference to the corresponding native request method and deliver parameters to the corresponding native request method. Alternatively, the customer request method may not call the corresponding native request method to thereby disable the browser API that leads to an outbound request.

The modification in step 400 may be performed at any time prior to execution of other steps of the method. In one example, the modification ultimately results in creating webpages 22 or HTML source code that are delivered to a browser of an end station computer 18 in response to a retrieval request as part of the browser interacting with the application server 20 to receive an online service. A browser receiving a modified one of the webpage 22 is typically programmed to automatically render the modified one of the webpages 22, which may include automatically parsing or interpreting and executing script code that is received as part of the webpage.

In step 402, when the one of the webpages 22 modified in step 400 is rendered at the end station computer 18, execution of the instrumentation code causes generating a list of one or more requested domains to which the end station computer 18 or browser executed thereon is sending data from the one of the webpages 22. If the one of the webpages 18 has been compromised with unauthorized or malicious code, the execution of that code may cause transmission or exfiltration of data from the end station computer 18 to a third-party domain.

Execution of the instrumentation code according to this technology causes automatically capturing the name or identity of any such domain and adding it to a list of requested domains. Thus, the instrumentation code includes logic to record the requested domains to which the data is being sent to from the one of the webpages 22. In one example, the generated list of requested domains is posted to the protection server apparatus 12 by the instrumentation code for further processing.

In step 404, the generated list of requested domains is analyzed by the protection server apparatus 12 to determine whether any of the requested domains in the generated list is a malicious domain. The generated list of requested domains may be received from the end station computer 18 by the protection server apparatus 12. Analysis may use a variety of scanning, parsing or interpretation techniques, including queries to local, remote or third-party databases that host domain metadata, reputation data or malware data, for example. In some examples, the protection server apparatus 12 accesses a list of known domains associated with the one of the webpages 22 from a data repository 14 and compares the generated list of requested domains with the list of known domains associated with the one of the webpages 22, to determine whether the generated list includes a new domain. The protection server apparatus 12 may update the list of known domains with a new domain.

In one example, the protection server apparatus 12 reviews, for each requested domain in the generated list, at least one of the following, to determine whether that domain is malicious: a certificate, a certificate issuer, a domain register, or DNS records or settings related to the domain. For example, a domain could be a known malware, a certificate could have been compromised, or an Internet protocol (IP) range could be in a known compromised block.

In step 406, in response to determining a malicious domain from the generated list, interceptor code is generated by the protection server apparatus 12 based on a type of attack associated with the malicious domain. In an embodiment, the protection server apparatus 12 may automatically and dynamically generate the interceptor code, which includes logic to reduce continued damage from the attack, for example.

In step 408, the instrumentation code is updated to include the interceptor code generated in step 406. In some examples, the protection server apparatus 12 may automatically update the instrumentation code stored at the application server 20 to include the interceptor code, either directly or by reference, for example, and other methods for updating the one of the web pages 22 to include the interceptor code can also be used.

In step 410, the interceptor code mitigates damage from the attack when the one of the webpages 22 is subsequently rendered by the end station computer 18 or another client device after the instrumentation code is updated with the interceptor code. Mitigation may be implemented using a variety of techniques that are automatically executed by the instrumentation code. In one example, damage from the attack may be mitigated by the instrumentation code canceling requests made from the one of the webpages 22 so that the requests cannot reach a third-party domain.

In another example, damage from the attack may be mitigated by the instrumentation code automatically poisoning data that is going out from the one of webpages 22. For example, data may be modified in arbitrary ways, such as by randomizing or generating unusable information, and substituting the unusable information into the output stream that is sent to a third-party domain. Other methods for mitigating the damage from the attack using the instrumentation code and interceptor code can also be used in other examples.

In some examples, the protection server apparatus 12 may generate a notification message or alert message regarding the malicious domain and may send the message to the application server 20, to an administrator computer, designated e-mail address, account or other location, for example. The notification message alerts the application server 20 of the attack associated with the malicious domain. For example, the notification message may identify the compromised code.

Although it has been described herein that the protection server apparatus 12 receives the generated list of domains and performs an analysis on the generated list to determine whether a requested domain in the generated list is malicious, the analysis may be performed on the end station computer 18 in other examples. In particular, the instrumentation code may include a whitelist of legitimate domains, an implied list of legitimate domains, or a blacklist of malicious domains and logic to make such a determination at the end station computer 18 regarding whether a domain is legitimate or malicious.

The end station computer 18 in these examples may intercept, when one of the webpages 22 including the instrumentation code is being rendered, a request to a domain and determine whether the domain is a malicious domain. If it is determined that the domain is a malicious domain, then the end station computer 18 may perform one or more negative actions defined in interceptor code of instrumentation code in the one of the webpages 22, such as but not limited to logging pertinent data regarding the malicious domain (e.g., intended destination, outbound data, etc.), transmitting notifications, disabling or blocking the request, or modifying outbound data so that the outbound data is no longer effective.

In an example, when a malicious domain is detected, the end station computer 18 may then notify the protection server apparatus 12 of an identification of the malicious domain such that the protection server apparatus 12 may then generate an appropriate interceptor code. In another example, the interceptor code can be incorporated in the instrumentation code sent with the one of the webpages 22 and configured to take an action based on an identified type of attack associated with a domain determined to be malicious. In yet other examples, once a malicious domain is detected, the protection server apparatus 12, the application server 20, or the end station computer 18 may notify crowdsourced malware parties regarding the malicious domain.

With this technology, web browsers are prevented from exfiltrating data. Detection includes instrumenting and automatically intercepting each point of exfiltration that exists in a webpage. Every domain to which outbound data is being sent to is recorded and analyzed in some examples of this technology. In response to a determining that one of the analyzed outbound domain is malicious, interceptor code is automatically and dynamically generated based on the type of attack associated with the malicious domain. Damage mitigation includes disabling request(s) or modifying outbound data so that the outbound data is no longer effective during subsequent loads or renderings of the webpage. The disclosed technology eliminates human action that would otherwise be required and reduces damages from network attack that would otherwise arise without prompt detection and corrective measures.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A network security method implemented by a network security system comprising one or more protection server apparatuses, server devices, or end station devices, the method comprising:
   receiving, from a client, a network request specifying a list of one or more domains to which the client has sent data during rendering of a webpage that comprises instrumentation code configured to intercept and post the network request, wherein the instrumentation code generates the list of one or more domains by intercepting one or more points of exfiltration in the webpage;
   determining when one of the domains is a malicious domain;
   generating interceptor code based on a type of attack that is associated with the one of the domains, when the determination indicates the one of the domains is a malicious domain;
   updating the instrumentation code to include the interceptor code, wherein the interceptor code is configured to mitigate the attack when the webpage is subsequently rendered by another client;
   comparing the list of one or more domains with a stored list of known domains associated with the webpage to determine when the list of one or more domains includes a new domain;
   determining when the new domain is a malicious domain without analyzing any of the domains included in the stored list of known domains; and
   updating the list of known domains to include the new domain, when the determination indicates that the new domain is a legitimate domain.

2. The network security method of claim 1, further comprising determining when the one of the domains is a malicious domain based on one or more certificate issuers, one or more domain registers, or one or more domain name system (DNS) records or settings associated with the one of the domains.

3. The network security method of claim 1, wherein the interceptor code is configured to cancel one or more requests made from the webpage or poison data sent from the webpage to mitigate the attack.

4. The network security method of claim 1, further comprising inserting the instrumentation code into source code for the webpage before receiving the network request, wherein the web page is hosted by an application server.

5. A protection server apparatus, comprising memory comprising programmed instructions stored thereon and one or more processors configured to be capable of executing the stored programmed instructions to:
   receive, from a client, a network request specifying a list of one or more domains to which the client has sent data during rendering of a webpage that comprises instrumentation code configured to intercept and post the network request, wherein the instrumentation code generates the list of one or more domains by intercepting one or more points of exfiltration in the webpage;
   determine when one of the domains is a malicious domain;
   generate interceptor code based on a type of attack that is associated with the one of the domains, when the determination indicates the one of the domains is a malicious domain;
   update the instrumentation code to include the interceptor code, wherein the interceptor code is configured to mitigate the attack when the webpage is subsequently rendered by another client;
   compare the list of one or more domains with a stored list of known domains associated with the webpage to determine when the list of one or more domains includes a new domain;
   determine when the new domain is a malicious domain without analyzing any of the domains included in the stored list of known domains; and
   update the list of known domains to include the new domain, when the determination indicates that the new domain is a legitimate domain.

6. The protection server apparatus of claim 5, wherein the processors are further configured to be capable of executing the stored programmed instructions to determine when the one of the domains is a malicious domain based on one or more certificate issuers, one or more domain registers, or one or more domain name system (DNS) records or settings associated with the one of the domains.

7. The protection server apparatus of claim 5, wherein the interceptor code is configured to cancel one or more requests made from the webpage or poison data sent from the webpage to mitigate the attack.

8. The protection server apparatus of claim 5, wherein the processors are further configured to be capable of executing the stored programmed instructions to insert the instrumentation code into source code for the webpage before receiving the network request, wherein the web page is hosted by an application server.

9. A non-transitory computer readable medium having stored thereon instructions for network security comprising executable code that, when executed by one or more processors, causes the processors to:
   receive, from a client, a network request specifying a list of one or more domains to which the client has sent data during rendering of a webpage that comprises instrumentation code configured to intercept and post the network request, wherein the instrumentation code generates the list of one or more domains by intercepting one or more points of exfiltration in the webpage;
   determine when one of the domains is a malicious domain;
   generate interceptor code based on a type of attack that is associated with the one of the domains, when the determination indicates the one of the domains is a malicious domain;
   update the instrumentation code to include the interceptor code, wherein the interceptor code is configured to mitigate the attack when the webpage is subsequently rendered by another client;

compare the list of one or more domains with a stored list of known domains associated with the webpage to determine when the list of one or more domains includes a new domain;

determine when the new domain is a malicious domain without analyzing any of the domains included in the stored list of known domains; and update the list of known domains to include the new domain, when the determination indicates that the new domain is a legitimate domain.

10. The non-transitory computer readable medium of claim 9, wherein the executable code, when executed by the processors further causes the processors to determine when the one of the domains is a malicious domain based on one or more certificate issuers, one or more domain registers, or one or more domain name system (DNS) records or settings associated with the one of the domains.

11. The non-transitory computer readable medium of claim 9, wherein the interceptor code is configured to cancel one or more requests made from the webpage or poison data sent from the webpage to mitigate the attack.

12. The non-transitory computer readable medium of claim 9, wherein the executable code, when executed by the processors further causes the processors to insert the instrumentation code into source code for the webpage before receiving the network request, wherein the web page is hosted by an application server.

13. A network security system, comprising one or more protection server apparatuses, server devices, or end station devices with memory comprising programmed instructions stored thereon and one or more processors configured to be capable of executing the stored programmed instructions to:

receive, from a client, a network request specifying a list of one or more domains to which the client has sent data during rendering of a webpage that comprises instrumentation code configured to intercept and post the network request, wherein the instrumentation code generates the list of one or more domains by intercepting one or more points of exfiltration in the webpage;

determine when one of the domains is a malicious domain;

generate interceptor code based on a type of attack that is associated with the one of the domains, when the determination indicates the one of the domains is a malicious domain;

update the instrumentation code to include the interceptor code, wherein the interceptor code is configured to mitigate the attack when the webpage is subsequently rendered by another client;

compare the list of one or more domains with a stored list of known domains associated with the webpage to determine when the list of one or more domains includes a new domain;

determine when the new domain is a malicious domain without analyzing any of the domains included in the stored list of known domains; and update the list of known domains to include the new domain, when the determination indicates that the new domain is a legitimate domain.

14. The network security system of claim 13, wherein the processors are further configured to be capable of executing the stored programmed instructions to determine when the one of the domains is a malicious domain based on one or more certificate issuers, one or more domain registers, or one or more domain name system (DNS) records or settings associated with the one of the domains.

15. The network security system of claim 13, wherein the interceptor code is configured to cancel one or more requests made from the webpage or poison data sent from the webpage to mitigate the attack.

16. The network security system of claim 13, wherein the processors are further configured to be capable of executing the stored programmed instructions to insert the instrumentation code into source code for the webpage before receiving the network request, wherein the web page is hosted by an application server.

* * * * *